April 17, 1928.
P. E. KLOPSTEG
1,666,743
McLEOD TYPE PRESSURE GAUGE
Filed Dec. 30, 1925
2 Sheets-Sheet 2
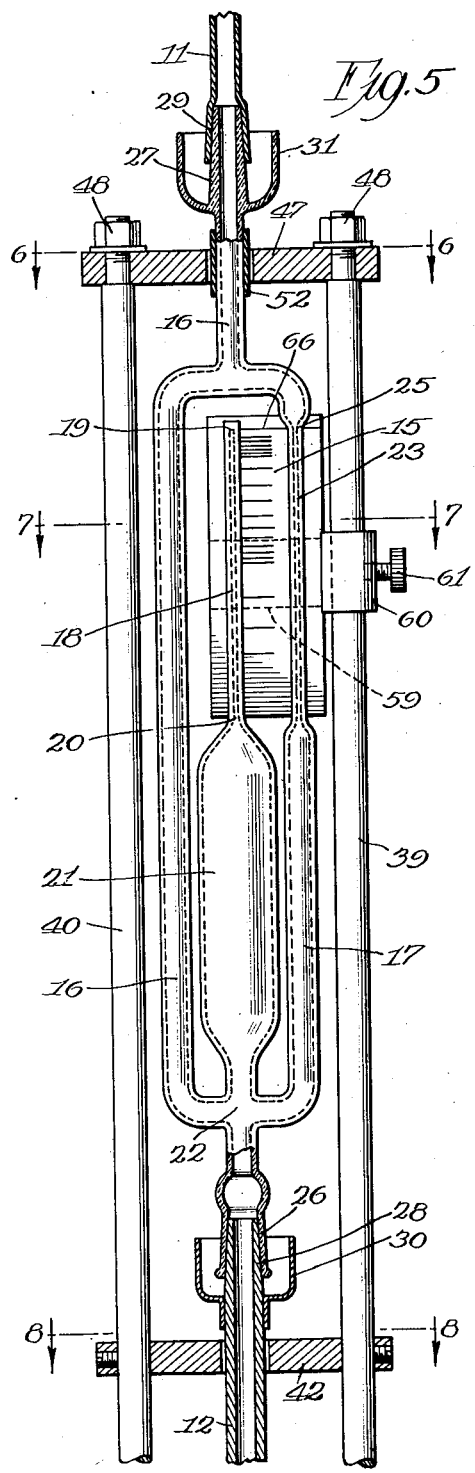
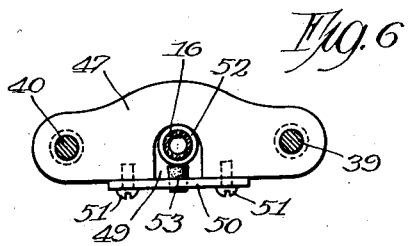
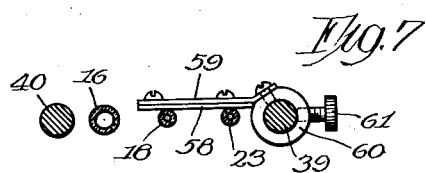
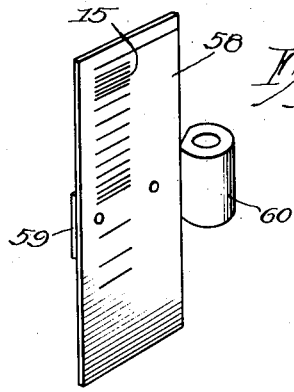
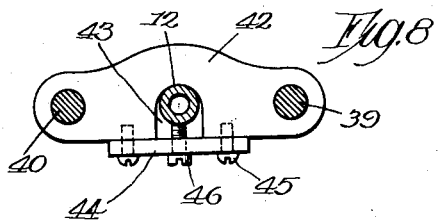
Inventor:
Paul E. Klopsteg
By Dillson, Mann & Cox
Attys Patented Apr. 17, 1928.

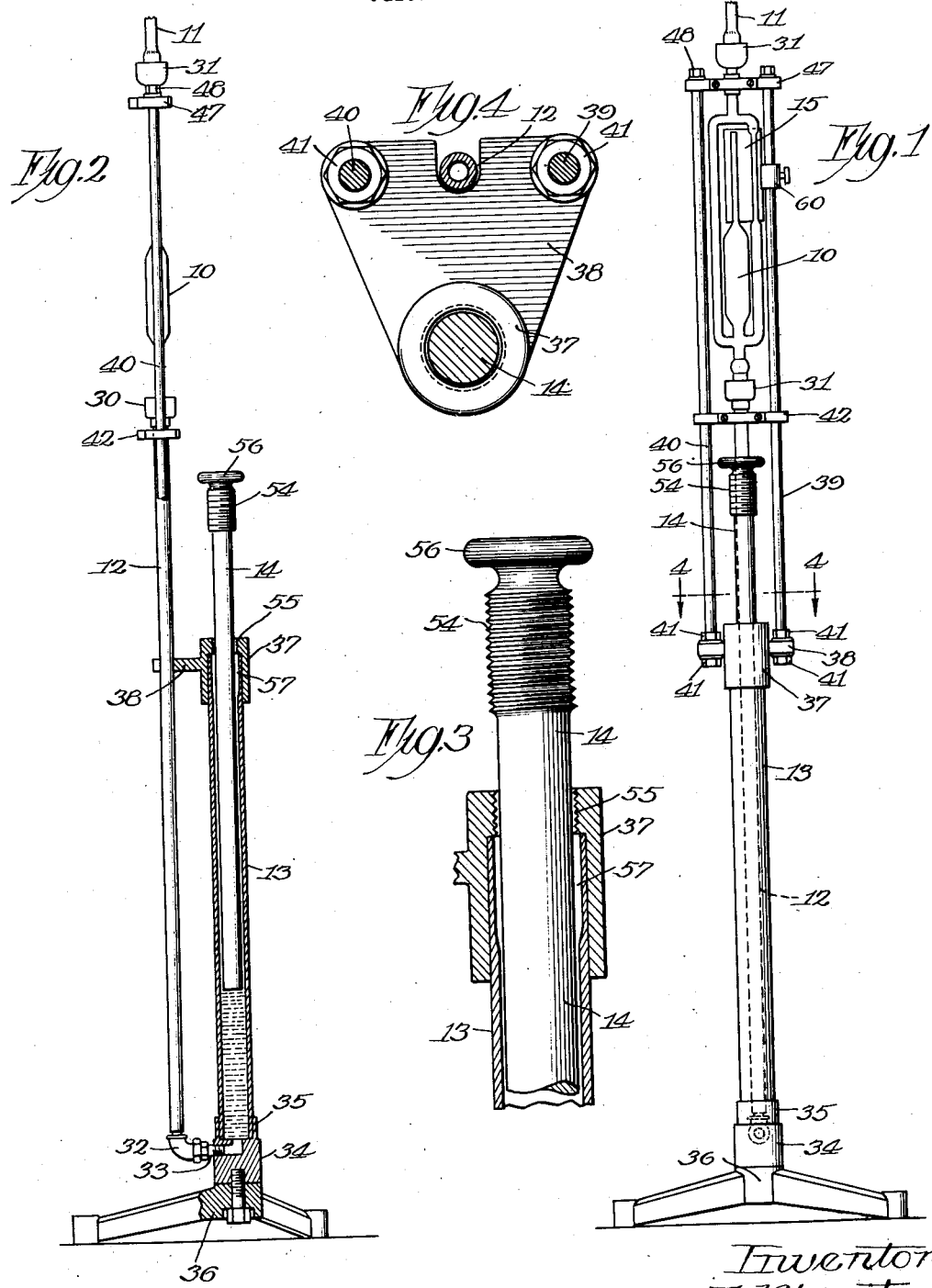

1,666,743

UNITED STATES PATENT OFFICE.

PAUL E. KLOPSTEG, OF CHICAGO, ILLINOIS, ASSIGNOR TO CENTRAL SCIENTIFIC COMPANY, OF CHICAGO, ILLINOIS, A CORPORATION OF ILLINOIS.

McLEOD-TYPE PRESSURE GAUGE.

Application filed December 30, 1925. Serial No. 78,334.

This invention relates to measuring instruments of the type generally known as McLeod gauges, and has for its principal objects to facilitate the rapid and accurate adjustment of the head of mercury, or other liquid used; to reduce the hazard of breaking and the cost of repairs; to facilitate the adjustment of the instrument when a new measuring head is installed; and to generally increase the ruggedness and serviceability of the instrument.

Further objects and advantages of the invention will be revealed as the disclosure proceeds and the description is read in connection with the accompanying drawings illustrating the preferred embodiment of the invention, and in which Fig. 1 is a front elevation of a McLeod gauge for measuring low gas pressures;

Fig. 2 is a side elevation of Fig. 1 with the cistern and pedestal in section;

Fig. 3 is an enlarged sectional view of a fragment of the cistern;

Fig. 4 is a transverse section on the line 4—4 of Fig. 1;

Fig. 5 is an enlarged front view of the upper portion of Fig. 1, showing part of the frame and the connections in section;

Figs. 6, 7 and 8 are transverse sectional views taken on the lines 6—6, 7—7 and 8—8 respectively of Fig. 5, and Fig. 9 is a perspective view of the support for the indicating scale.

This preferred embodiment of the invention includes a glass measuring head 10, connected at its upper end with the low pressure system 11, and at its lower end with a steel barometric column 12 which, in turn, is connected with a mercury cistern 13 equipped with a plunger 14 by which the mercury may be raised into the measuring head 10 to indicate on the scale 15 the pressure in the system 11.

The measuring head (Fig. 5) includes a main tube 16 and the by-path 17 offset between their ends to form a loop within which is a capillary tube closed at its upper end 19 and connected at its lower end 20 with a bulb 21 which, in turn, communicates with the main tube and the by-path at 22, where they join to form the bottom of the loop.

The by-path 17 includes a capillary section 23 beginning at the level of the lower end 20 of the capillary tube 18 and extending parallel to that tube as far as its upper end 19.

The main tube, the by-path, the bulb, and the capillary tube are ordinarily in open communication with the system 11 through the large tube 16 which latter is purposely made large to permit rapid exhaust of the bulb at low pressures. When a reading is to be taken mercury is forced up into the head until it rises in the capillary section 23 of the by-path to the point 25 on the level with the extreme upper end of the bore of the capillary tube at 19. When the mercury passes the point 22 the attenuated gas within the bulb 21 and the capillary tube 18 is trapped and as the mercury rises it is compressed within the capillary tube. When the mercury reaches the point 25 in the tube 23 it will be somewhat below the point 19 in the tube 18; and the difference in elevation in the two tubes forms a basis for measuring the pressure within the system 11, by using the formula $P = (a/V)h^2$; where P is the pressure in the system 11, $a$ is the volume of the capillary tube 18 per unit of length; V is the volume of fluid trapped within the bulb 21 and the tube 18 and $h$ is the difference in elevation of the mercury within the tubes 18 and 23, measured in the same unit as the length of the capillary tube of which $a$ is the volume.

The measuring head may be connected with the system 11 and the barometric column 12 in a variety of ways, but preferably it is equipped with Morse tapers 26 and 27 co-operating with complemental tapers 28 and 29, and surrounded by sealing cups 30 and 31.

The barometric column 12 may be a piece of steel tubing ground to form the taper 28 and having the cup 30 pressed on its upper end; and at its lower end, equipped with an elbow 32 having a nipple 33 threaded into the base 34 of the cistern 13. The body of the cistern 13 may also be made of a piece of commercial tubing telescoping with and welded to a flange 35 on the cast base 34, and this base may be mounted on pedestal 36.

The upper end of the cistern 13, here shown, is equipped with a collar 37 telescoping with the body and having a flange 38 receiving rods 39 and 40 clamped thereto by nuts 41. Adjacent to the upper end of the barometric column 12, the rods 39 and 40 are fitted with a cross piece 42, having an open notch 43 receiving the column and equipped with a strap 44 secured across the notch by screws 45 and having an adjustable screw 46 adapted to bind the column to the cross piece.

At their upper ends the rods 39 and 40 are reduced and threaded to receive a top cross piece 47 and nuts 48 by which the cross piece and rods are secured together. The cross piece 47 has a notch 49 loosely receiving the main tube 16 of the measuring head and the notch is closed by a strap 50 held in place by screws 51. The measuring head being fragile, the tube 16 is surrounded by a cushion of rubber, or the like, 52 and the strap 50 is equipped with a cushion 53 of cork, or the like, adapted to bear against the cushion 52 and support the measuring head within the notch.

The plunger 14 in this preferred form is a cylindrical rod of wood having in its upper end an enlarged threaded portion 54 adapted to engage threads 55 in the upper end of the collar 37. Above the threads 54 the plunger has a knob 56 by which it may be readily manipulated. The bore of the cistern 13 is slightly enlarged at 57 to provide clearance for the threads 54.

The volumes of the bulb 21 and the capillary 18 per unit of length will be different in each measuring head, as will also the position of the extreme upper end 19 of the capillary. Hence, each measuring head requires a special scale with its datum line at a special height.

For this reason the scale 15 is mounted upon a scale plate 58 (Figs. 7 and 9) carried by an arm 59 on a sleeve 60 slidably mounted on the rod 39 and having a set screw 61 by which the collar and, hence, the scale may be attached to the rod at any particular position.

The capillary tube 18 is left open at its upper end until it has been calibrated, when it is sealed with care to avoid any tapering of the cavity. The data for calibrating may be secured by moving a drop of mercury of known volume along the tube and measuring its length in different positions and by weighing the mercury required to fill the bulb 21.

The instrument is ordinarily in the condition indicated in Figs. 1 and 2. When it is desired to take a reading the operator pushes the plunger 14 down, engages the threads 54 and 55, and rotates the plunger until the mercury in the tube 23 reaches the point 25. When the mercury passes the point 22 it traps the fluid in the bulb 21 and the capillary 18 and compresses it within the capillary. The scale 15 is adjusted to bring the datum line 66 (Fig. 5) against the point 19 and the upper end of the mercury in the tube 18 indicates on the scale the pressure in the system 11.

In its preferred form the plunger fits the cistern with clearance so that the mercury rises between the cistern wall and the plunger and thus rapidly increases the head as the plunger is forced down.

The invention permits a very rapid rough adjustment of the mercury column followed by an accurate slow motion adjustment that eliminates, to a great extent, the personal equation in taking readings, and also saves time.

The barometric column and measuring head measure approximately fifty-two inches (52″) in length. Heretofore these have been made in one piece of glass and, hence, the instruments have not only been expensive at first cost, but also in upkeep. By making the barometric column of a strong material the portion in glass, or other fragile material, is reduced to such dimensions that it can be much more easily and safely handled, and the first cost and the upkeep are both greatly lessened. The mounting of the measuring head on the barometric column and in the frame permits it to be readily aligned without straining and at the same time permits it to be readily removed and replaced with accuracy and safety.

The mounting for the scale simplifies the change of measuring heads and permits the new scale to be attached to the plate and then readily adjusted to bring the datum line at the proper height for the new measuring head.

All the parts except the measuring head may be cheaply manufactured, either from commercial stock or from cheap castings, at low cost, and will endure through a long period of service without any particular care.

Small size of glassware (measuring head only) simplifies cleaning and makes the head less liable to break while cleaning, which is occasionally necessary because clean mercury is required for accurate readings. Capillary tubes 18 and 23 should be the same diameter, and preferably cut from the same piece, to insure equal capillary depression of mercury in both tubes; thereby increasing accuracy of measurement.

I claim as my invention:

1. In a McLeod gauge, a measuring head including a main tube and a by-path tube forming a loop, a bulb connected with the loop at the bottom and extending upwardly therein, a capillary tube connected at its lower end with the bulb and closed at its upper end, the by-path tube having a capillary section beginning at the level of the bottom of the capillary tube and extending parallel thereto, the main tube being extended beyond the loop.

2. In a McLeod gauge, the combination of a frame including a cross piece having a notch therein, a measuring head having a tubular portion received in said notch, a strap enclosing the notch and a cushion carried by the strap and engaging the tube.

3. In a measuring instrument of the McLeod gauge type, the combination of a tube in which mercury is to be raised, an upright elongated cistern connected with the tube, a relatively light plunger fitted in the cistern and freely movable therein for the greater portion of its length, and a slow motion adjustment for the plunger including threads on the plunger and complementary threads fixed with respect to the cistern.

4. In a measuring instrument of the McLeod gauge type, the combination of a glass measuring head, having an internal Morse taper at its lower end and a metallic barometric tube having a complementary internal Morse taper surrounded by a sealing cup.

5. In a McLeod gauge, a measuring head including a main tube and a by-pass tube forming a loop, a bulb connected with the loop at the bottom and extending upwardly therein, a capillary tube connected at its lower end with the bulb and closed at its upper end, the by-path having a capillary section extending parallel to the capillary tube, and the main tube being extended beyond the loop and provided with means for connecting it with a barometric column and a chamber to be tested.

In testimony whereof I affix my signature.

PAUL E. KLOPSTEG.